Nov. 17, 1964 W. H. JONES 3,157,824

SIMPLIFIED MEMORY CIRCUIT FOR X-Y PLOTTER

Filed April 4, 1962 2 Sheets-Sheet 1

INVENTOR.
WILLIAM H. JONES
BY
Richard P. Albers
AGENT

INVENTOR.
WILLIAM H. JONES
BY
Richard P. Alberi
AGENT

United States Patent Office 3,157,824

Patented Nov. 17, 1964

3,157,824

SIMPLIFIED MEMORY CIRCUIT FOR X-Y PLOTTER

William H. Jones, Santa Monica, Calif., assignor, by mesne assignments, to Lear Siegler, Inc., Santa Monica, Calif., a corporation of Delaware Filed Apr. 4, 1962, Ser. No. 185,075
4 Claims. (Cl. 315—169)

This invention relates to X–Y plotting devices and more particularly to a memory for an electronic X–Y plotting device.

In the present state of the art, X–Y plotting devices are known. Usually they consist of X (horizontal) electrodes and Y (vertical) electrodes positioned on either side of an illuminating apparatus. The illuminating apparatus may be electroluminescent phosphor, or it may be a gas cell whereby electron discharge illuminates the cell. Generally, either the X electrodes or the Y electrodes are positioned on a transparent plate so that the illumination may be viewed from outside the device. When one X electrode and one Y electrode is electrically connected to a power source, the gas cell, or a portion of electroluminescent material which is between the cross point of that particular X and Y electrode, is subjected to an electron discharge or an electrical potential which illuminates the cell. By choosing another X and another Y electrode, another cell may be illuminated.

It is also possible in the present state of the art to illuminate all of the cells. However, the electrodes are usually selected by a position switch which only contacts one of the Y and one of the X electrodes at a time to form a point by point readout. This means that when a second cell is desired to be illuminated, the first cell is disconnected from the power source thereby causing the cell to be de-energized and not illuminated.

For certain operations it is desirable once a cell has been illuminated to have it remain illuminated while selecting and illuminating other cells. This may be accomplished by means external to the device as by a massive computer. In other words, the computer computes which electrodes in the X and Y planes are to remain connected to the potential to illuminate the new desired cell. Such a computer, however, entails a mass of circuitry and electronics which renders the X–Y plotter virtually impractical for most applications.

It is, therefore, an object of the present invention to provide an X–Y plotter with a built-in memory device.

It is another object of the invention to provide an X–Y plotter with a memory without the use of external complicated circuits.

It is another object of the present invention to provide an X–Y plotting device which has a built-in memory such that any position which is illuminated, automatically, remains illuminated during the selection and illumination of other cells.

Other objects and advantages of the present invention will become apparent from the following description when taken in conjunction with the drawings, in which.

Figure 1:
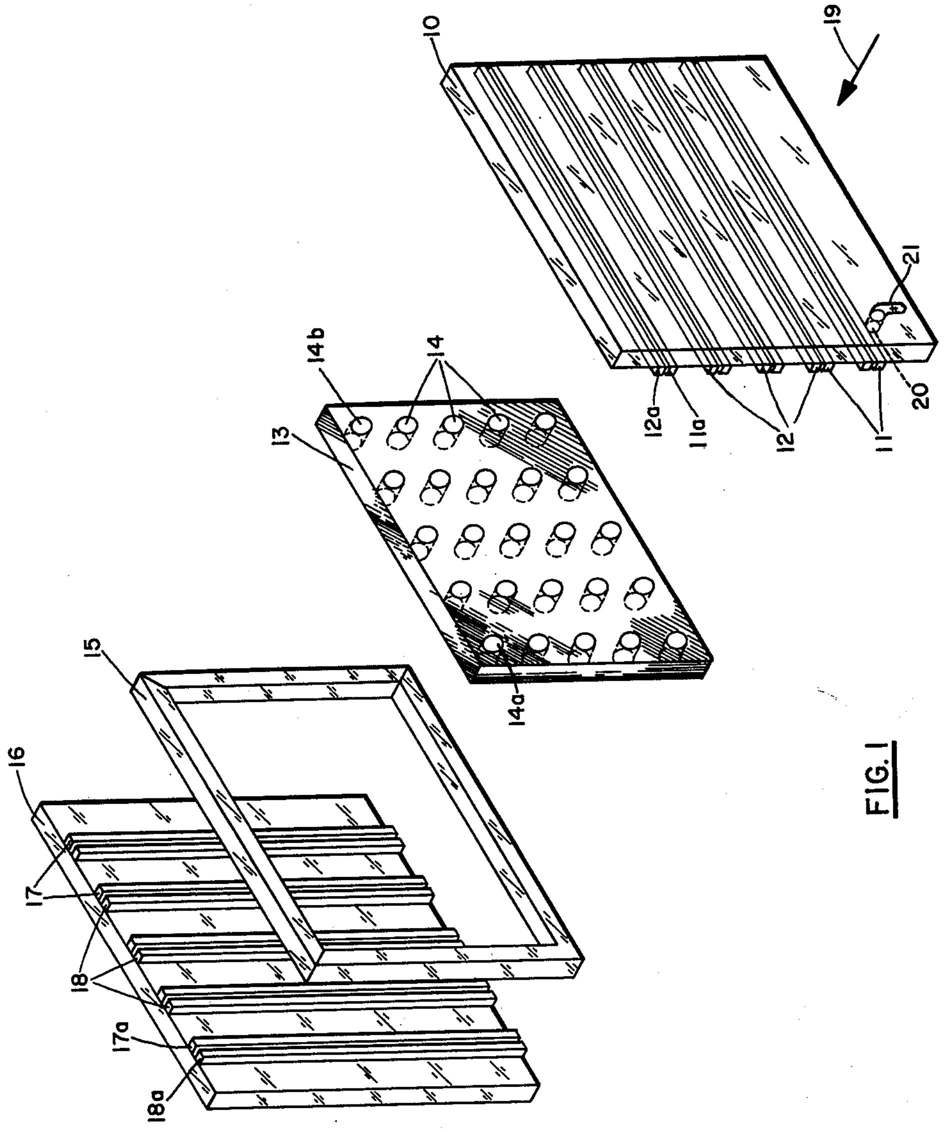
FIG. 1 is an exploded perspective view of the invention.

Referring to FIG. 1 a transparent plate 10 has electrodes 11 and 12 on one side thereof. Note that one electrode 11 and one electrode 12 are relatively close together as opposed to the space between one pair of electrodes 11 and 12 and another pair of electrodes 11 and 12. The number of electrodes shown comprise five pairs; however, the number may be greater or less, as desired.

The dimensions of the electrodes are exaggerated for explanation purposes. The method of putting electrodes on plate 10 will be described below.

On the electrode side of plate 10 there is an insert 13 having holes 14 passing therethrough. The horizontal alignment of the holes 14 coincides with the horizontal alignments of the electrodes 11 and 12. Note that when the plate 10 is placed against the insert 13, one electrode 11 and one electrode 12 will pass over all of the holes in the particular row of holes in alignment with that pair of electrodes 11 and 12. The number of horizontal lines of holes 14 also equals the number of horizontal pairs of electrodes 11 and 12. The holes are aligned in substantially evenly spaced rows which cross at right angles on the insert. That is, the holes are arranged in columns and rows at right angles to each other. Positioned on the side of insert 13, further removed from electrodes 11 and 12, is a frame 15 which is employed to facilitate sealing the insert 13 between plates 10 and 16. The frame 15 is constructed so that it is large enough to enclose the insert 13 but is small enough so that the electrodes 11 and 12 on plate 10 extend beyond either end of the frame 15. This allows for external electrical connections to be made to the electrodes 11 and 12. On the other side of the frame 15 is the end plate 16. The end plate 16 has electrodes 17 and 18 thereon. One electrode 18 and one electrode 17 form a pair similar to the pair formed by electrodes 11 and 12. The number of pairs of electrodes 17 and 18 equal the number of holes 14 in horizontal line across the insert 13. The plate 16 and the electrodes 17 and 18 are of such length that when the frame 15 is placed against the plate 16, the electrodes 17 and 18 extend beyond the frame 15 at the top and bottom. The electrodes, however, are very thin, from about 500 angstroms to about .005 inch thick, so that the frame 15 can readily be attached to plates 10 and 16 with a sealing composition. This, again, is to facilitate the external electrical connections to the electrodes 17 and 18.

The plate 16 is preferably made of transparent material such as glass, however, it can be made of ceramic, or the like. Plate 10 is made of transparent material such as glass as, for example, soft glass, Pyrex, or the like. The electrodes 11, 12, 17 and 18 can be of any conductive material such as copper, Nichrome, a plurality of layers of different material, etc., as is more fully described in the co-pending application of the common assignee bearing Serial Number 185,015, filed April 4, 1962.

The frame 15 is constructed preferably of the same material as the plates 10 and 16. It is to be noted that the electrodes 11 and 12, if the unit is to be viewed from the direction indicated by arrow 19, should be made transparent by depositing a very thin layer of electrode material. The electrodes 11 and 12 can be put on the plate 10 by vapor deposition, sputtering, spraying, or the like as set out in the above mentioned co-pending application.

The unit is assembled by placing the insert 13 inside the frame 15 and then placing the end plates 10 and 16 up against the frame 15 while applying a sealant to the faces of frame 15, for example, a cement or a frit seal as commonly used in the art.

A hole 20 in the plate 10 and a tip-off or tube 21 provides a means for evacuating the holes 14 and filling the same with a gas such as neon, krypton, argon, or the like.

Figure 2:
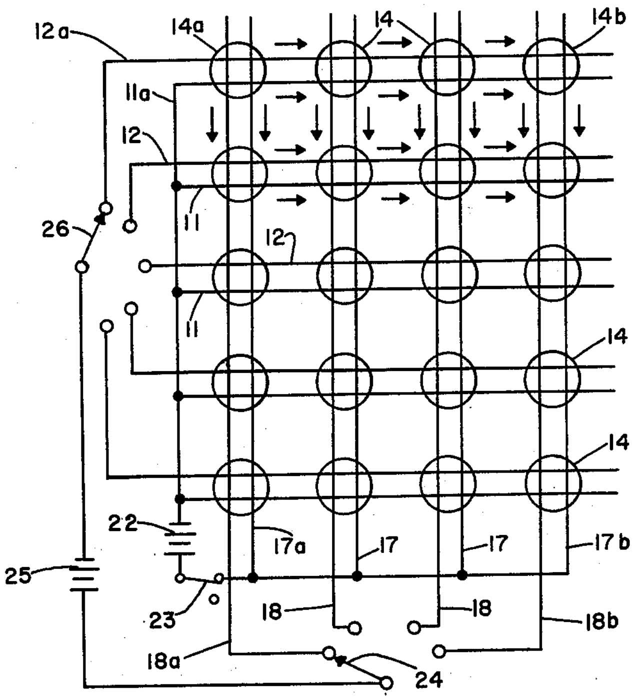
FIG. 2 is a schematic drawing of the present invention.

The electrical circuit is shown in FIG. 2 wherein a battery, or power source 22 has one terminal electrically connected to the end of each of the electrodes 11 and the other terminal connected to one end of each of the electrodes 17 by way of switch 23, and a switch 24 is connected to the positive side of a power supply 25, and the wiper arm of switch 24 is capable of contacting any one of the electrodes 18. A switch 26 is connected to the other side of power supply 25 and is capable of contacting any one of the electrodes 12.

It is well known in the art that the holes or cells 14 require a certain firing voltage, for example, 300 volts but the holding voltage is lower, for example, 250 to 275 volts. Therefore, the battery or power supply 22 provides sufficient voltage to hold the cells 14 illuminated once they have been fired by a higher voltage. The power supply 25 has a voltage which is sufficiently high to fire any one cell.

*Operation of the System*

Switch 23 is closed so that approximately 250 to 275 volts appears across each of the cells 14. Such voltage is not sufficient to fire the cells, and, therefore, the cells do not illuminate. However, when switch 24 is switched to, for example, electrode 18*a* and switch 26 is switched, for example, to electrode 12*a*, then the cell 14*a* has the firing voltage from the battery or power supply 25 applied across it, which, in turn, causes cell 14*a* to illuminate. When the switches 24 and 26 are moved to another position, then cell 14*a* remains illuminated because of the voltage from the power supply 22. It is to be noted that the current flow through the electrodes 11, 12, 17 and 18 is critical and the electrodes must be connected so that the electron flow in any pair of electrodes, for example, 11*a* and 12*a* or 17*a* and 18*a* is in the same direction as indicated by the arrows in FIG. 2. If the electron flow in 11*a* and 12*a* were not in the same direction, for example, if the electron flow in electrode 12*a* were reversed from that shown by the arrows, then it can be seen that when, for example, cell 14*b* were selected to be illuminated, the electron flow in electrode 12*a* and the resultant magnetic field would oppose that electron flow in electrode 11*a*, and, furthermore, actually induce an opposite electron flow in the electrode 11*a*, thereby rendering the memory voltage in the electrode 11*a* ineffective to hold a full line of cells illuminated. The same condition exists for the vertical electrodes 17 and 18.

When this device is assembled as described above, the switches 24 and 26 can be used to illuminate a given cell 14 and maintain that cell illuminated as long as switch 23 is closed.

Such a device can display figures, letters, numbers, and can be used for example, for a display board in an airport to display arrival and departure information. Furthermore, the device may be used to display information required in aircraft instrument panels. Other uses and application for the device are readily apparent from the foregoing.

Although this invention has been particularly described herein, it is not intended that it should be limited by the above description, but only in accordance with the spirit and scope of the appended claims.

What I claim:

1. An X–Y display panel consisting essentially of:

a first plate having a first side and a second side and having a plurality of gas-containing holes arranged in columns and rows therein, a second transparent plate, having a first set of a plurality of pairs of elongated firing and holding electrodes thereon, superposed on the first side of said first plate with said first set of electrodes juxtaposed to said first side of said first plate, each pair of a said firing electrode and a said holding electrode intersecting each hole in a said row of holes, a third plate, having a second set of a plurality of pairs of elongated firing and holding electrodes thereon, superposed on the second side of said first plate with said second set of electrodes juxtaposed to said second side of said first plate, each pair of a said firing electrode and a second holding electrode intersecting each hole in a said column of holes, the electrodes in said second set of electrodes intersecting the electrodes in said first set of electrodes substantially at right angles, and means sealing the peripheral edge of said panel gastight.

2. The panel of claim 1 and in addition a first electrical circuit means connecting the firing electrodes in said first set of electrodes with the firing electrodes in said second set of electrodes to enable the firing of a gas in a desired hole at the intersection of two such electrodes by pulsing such electrode with a required firing voltage.

3. The panel of claim 2 and in addition a second electrical circuit means connecting the holding electrodes in said first set of electrodes with the holding electrodes in said second set of electrodes to permit the setting up of a biasing voltage therebetween to permit the holding of a gas in a hole in a state of illumination once it has been fired.

4. The panel of claim 3 wherein said first and second electrical circuit means provide for a flow of electricity in the same direction in any given said pair of electrodes.

References Cited in the file of this patent

UNITED STATES PATENTS

| | | |
|---|---|---|
| 2,933,648 | Bentley | Apr. 19, 1960 |
| 2,988,647 | Duinker et al. | June 13, 1961 |
| 3,042,823 | Willard | July 3, 1962 |

FOREIGN PATENTS

| | | |
|---|---|---|
| 845,213 | Great Britain | Aug. 17, 1960 |